(12) United States Patent
Adams

(10) Patent No.: US 6,491,271 B1
(45) Date of Patent: Dec. 10, 2002

(54) MAGNETIC HOOK OR CLIP

(75) Inventor: William E. Adams, Butler County, PA (US)

(73) Assignee: Adams Mfg. Corp., Portersville, PA (US)

( * ) Notice: Subject to any disclaimer, the term of this patent is extended or adjusted under 35 U.S.C. 154(b) by 0 days.

(21) Appl. No.: 10/029,437

(22) Filed: Dec. 19, 2001

(51) Int. Cl.[7] ............... A47G 1/17; A47F 5/00; F16B 45/00
(52) U.S. Cl. ............ 248/206.5; 248/301; 248/304; 248/305
(58) Field of Search ............... 248/206.5, 304, 248/305, 301

(56) References Cited

U.S. PATENT DOCUMENTS

| | | | |
|---|---|---|---|
| 3,963,272 A | * | 6/1976 | Jones .................. 297/172 |
| 4,100,576 A | * | 7/1978 | Ditthardt .................. 358/128 |
| 4,269,486 A | * | 5/1981 | Shintani .................. 350/486 |
| D286,013 S | | 10/1986 | Adams |
| 4,825,526 A | | 5/1989 | Shenier et al. |
| 5,269,083 A | * | 12/1993 | Vampatella ............. 40/124.1 |
| 5,340,634 A | | 8/1994 | Adams |
| D350,943 S | | 9/1994 | Adams et al. |
| 5,411,231 A | | 5/1995 | Buck |
| D368,016 S | | 3/1996 | McDowell et al. |
| D368,017 S | | 3/1996 | McDowell et al. |
| D368,018 S | | 3/1996 | McDowell et al. |
| 5,639,049 A | * | 6/1997 | Jennings .................. 248/74.2 |
| D396,184 S | | 7/1998 | Adams et al. |
| D405,681 S | | 2/1999 | McDowell et al. |
| D416,788 S | | 11/1999 | Jones et al. |
| D421,565 S | | 3/2000 | Jones et al. |
| 6,076,790 A | * | 6/2000 | Richter .................. 248/206.5 |
| 6,082,701 A | * | 7/2000 | Reymann .................. 249/160 |
| 6,302,363 B1 | * | 8/2001 | Olson .................. 248/206.5 |
| 6,352,229 B1 | * | 3/2002 | Adams .................. 248/316.7 |
| 6,364,267 B1 | * | 4/2002 | Pearce .................. 248/304 |

FOREIGN PATENT DOCUMENTS

GB 2177747 A * 1/1987 .......... F16B/45/00

* cited by examiner

Primary Examiner—Ramon O. Ramirez
Assistant Examiner—Amy J. Sterling
(74) Attorney, Agent, or Firm—Buchanan Ingersoll, P.C.

(57) ABSTRACT

A magnetic hook, jaw-type clip or spring clip has a rectangular housing containing magnets. A conventional hook or clip is attached to the housing. A finger tab extends from one edge or wall of the housing. When a user desires to remove the magnetic hook from a mounting surface he or she places a fingertip on a curved portion of the finger tab causing the upper edge of the magnetic hook to move away from the mounting surface. This results in a pivoting action forcing the magnetic hook away from the mounting surface with little or no sliding. A flexible fin may be adjacent the magnets and extend slightly beyond the housing. When the magnet is placed against a metal surface the flexible fin will bend to a smaller height and bear against the metal surface thereby improving the load carrying capacity of the device.

20 Claims, 4 Drawing Sheets

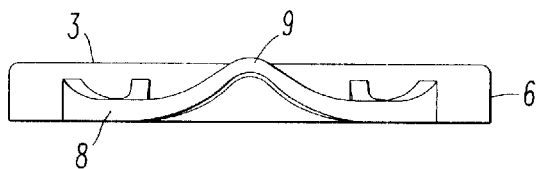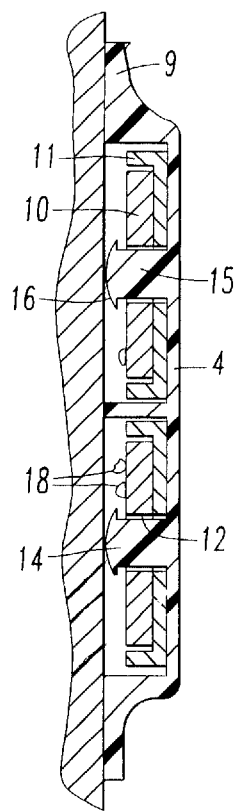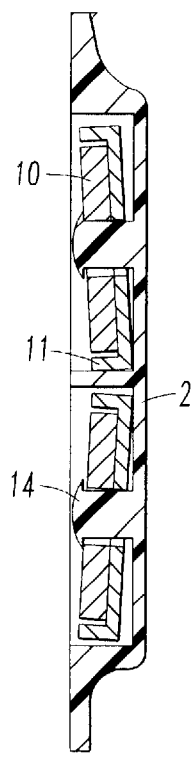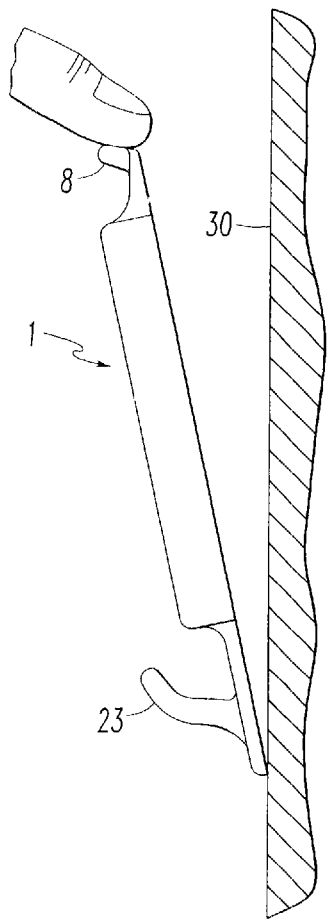

MAGNETIC HOOK OR CLIP

FIELD OF THE INVENTION

This invention relates to hooks and clips having a magnet attached for holding objects on metal surfaces.

BACKGROUND OF THE INVENTION

There have been a wide variety of hooks and jaw-type clips which have magnets attached thereto for holding objects on refrigerator doors and other metal surfaces. For example, the jaw-type clip of my U.S. Design Pat. No. Des. 286,013 has been sold for many years with a magnet attached to the back surface. For that product I have used the magnet arrangement shown in my U.S. Pat. No. 5,340,634 and U.S. Pat. No. Des. 350,943. A rectangular magnet is held in a U-shaped magnet holder. A fastener passes through a hole in the magnet and magnet holder and into the jaw-type clip. I have used metal and plastic rivets as fasteners.

The load carrying capability of a magnetic hook or magnetic jaw-type clip is dependent upon the size and strength of the magnet as well as the type of mounting surface to which the magnet is attached. Conventionally, magnets used for hooks have been rectangular or square in shape ranging from approximately one to two inches in length and width. A clip or hook having a magnet approximately one inch square attached to a metal surface such as a refrigerator door will hold from about one half to one pound before sliding. Larger magnets have been proposed to hold more weight. For example, a flat circular magnet two inches in diameter has been sold for hanging Christmas wreaths on metal doors or other metal surfaces.

Efforts have been made to increase the holding power of a magnet mounted hook. In U.S. Pat. No. 5,411,231, Buck discloses a suction cup in the center of a circular magnet. Sheiner et al. in U.S. Pat. No. 4,825,526 provide a washer formed of a medium durometer elastomer such as rubber or neoprene around the rivet which attaches the magnet to the body of the fastener. They teach that the thickness of the washer should be such that the washer protrudes slightly above the housing containing the magnet. The suggested slight protrusion is one mil. The height of the washer is critical. If the washer is too thick, the magnetic attraction between the magnet and the metal mounting surface will be reduced. If the washer is too thin, the washer will not press against the mounting surface.

There are several variables which affect the amount by which a washer or spacer attached to a magnet will protrude above the magnet holder which holds the magnet. Magnets vary in thickness by as much as ½ mil. The height of a plastic or metal channel which serves as a magnet holder can vary by as much as ½ mil. A plastic rivet which fits through the magnet and the socket into which the rivet fits can vary in height or depth by up to 1 mil.

Magnet mounted hooks usually are made to be both decorative and functional. Often the manufacturer wishes to offer the product in a variety of colors. I have found that the pigment placed in both the molded vinyl washer and the plastic on which it is mounted affects the thickness of the washer. Two pieces of plastic made in the same mold but of two different colors may differ in thickness from ⅛ to ½ mils depending upon the thickness of the part. If one is attempting to obtain precisely the one mil protrusion needed, and recommended by Steiner et al, a different mold may be required for each color washer and for each color of plastic base. Obviously, this is impractical. Furthermore, separate molds for each washer color will not overcome the combinations of variations in heights or thickness of the magnet, magnet holder, rivet and socket.

Other variables are introduced by ambient temperatures and humidity around the molding machine. Differing rates of shrinkage in washer, base, and plastic rivet make it impossible for one size or thickness of washer to guarantee high-quality magnetic attraction and maximum slide-resistance. Other changes in thickness are caused by material changes. If the rivet is made of polycarbonate, it will be a different length than if it is polypropylene, even though it is made in exactly the same cavity. A manufacturer must compensate for these minute changes.

As Sheiner et al. disclose and those skilled in the art recognize, the magnetic attraction between a magnet and a metal surface decreases as the distance between the magnet and the metal surface increases. Furthermore, a magnetic hook placed on a smooth flat surface will hold more weight than the same magnetic hook placed on a curved or irregular surface.

It is quite common for a magnetic hook to attract metal filings and other grit during storage or prior to being placed upon a metal surface. If the magnetic hook is slid across that surface the grit on the magnet may scratch the surface. Very often a person seeking to remove the magnetic hook from a metal surface will slide the hook across the surface during removal, scratching the surface. Consequently, there is a need for a magnetic hook that can be easily removed from a magnetic surface without sliding. More particularly the magnetic hook should be configured to encourage and facilitate removal without sliding the magnet across the surface.

There is a need for magnetic hooks and clips which will have increased holding power and can be made in a variety of colors. Preferably, the size of the magnets in these hooks should not be significantly larger or more expensive than those currently in use. Indeed, the optimal solution would utilize the same magnets, magnet holders and rivets that are commercially available and make them more effective. Then the cost of adopting the improvement would be small and perhaps insignificant. Furthermore, those magnetic hooks should be configured to facilitate removal from a metal surface without sliding the magnet across the metal surface.

SUMMARY OF THE INVENTION

I provide a magnetic hook or clip which has a plurality of magnets attached to a plastic housing. The housing is preferably rectangular and has a hook or clip near the bottom edge. A finger tab is provided on the housing for removal of the hook from a surface without the hook sliding across the surface to which it is attached.

The housing has a base and a wall extending from the perimeter of the base a distance greater than the thickness of the magnets attached to the base. The difference in distance should not exceed 1/32 of an inch. Each magnet is attached by a metal or plastic fastener having a head and a shaft. The shaft extends through a hole in the magnet and into the housing. The length of the shaft may be somewhat greater than the thickness of the magnet allowing the magnet to pivot and move up and down on the shaft. A flexible wall having a height slightly greater than the height of the housing may be provided between or around magnets. The wall extends slightly beyond the housing. When the magnet is placed against a mounting surface, the flexible wall will bend and press against the mounting surface. The wall provides increased frictional contact between the magnet and the mounting surface thereby increasing the holding power of the hook. This product can be made using the same magnets as are presently being used for comparable hooks and clips presently available in the marketplace.

These and other advantages and features of the present invention will become more fully understood upon reference to the accompanying drawings illustrating certain presently preferred embodiments of the invention.

BRIEF DESCRIPTION OF THE DRAWINGS

FIG. 4 is top plan view of the magnetic hook shown in FIG. 1.

FIG. 5 is a cross-sectional view taken along the line V-V of FIG. 2.

FIG. 6 is a sectional view similar to FIG. 5 showing an alternative mounting arrangement for the magnets.

FIG. 7 is a left side view of the magnetic hook shown in FIG. 1 being removed from a mounting surface.

DESCRIPTION OF THE PREFERRED EMBODIMENTS

Figure 1:
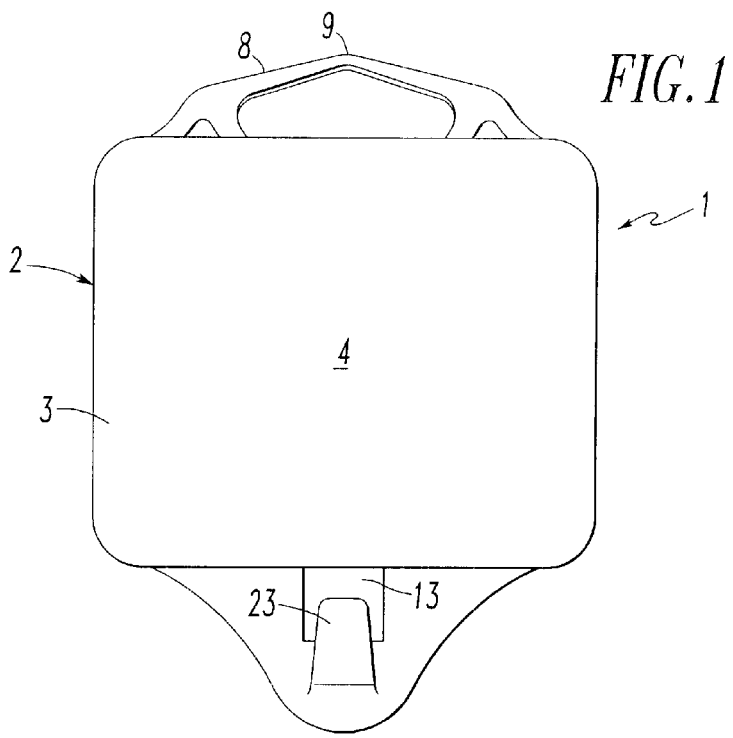
FIG. 1 is a front plan view of a first present preferred embodiment of my magnetic hook.
Figure 3:
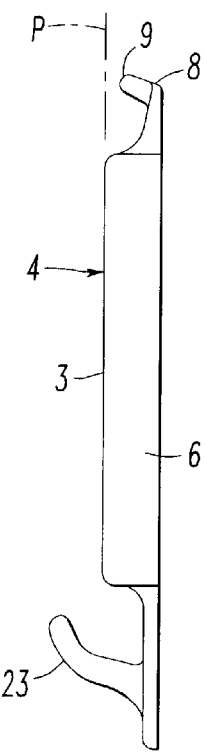
FIG. 3 is a left side view of the magnetic hook shown in FIG. 1.
Figure 2:
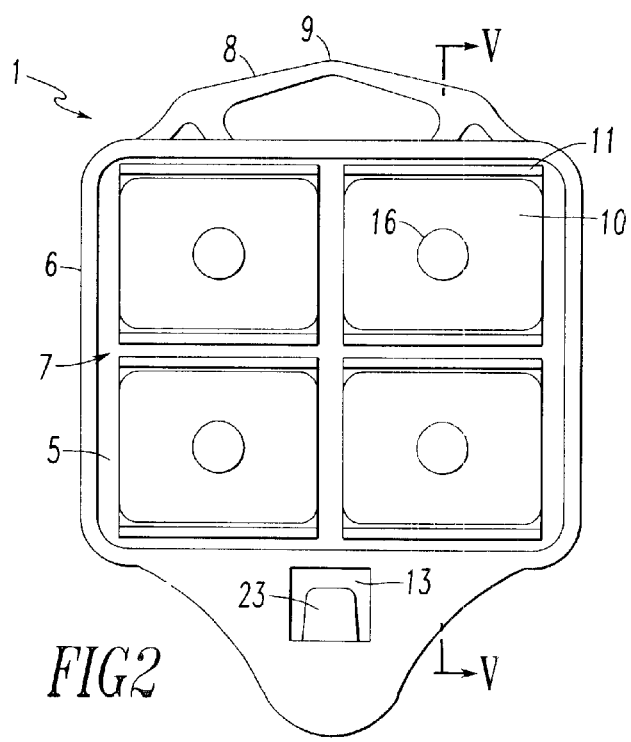
FIG. 2 is a rear elevational view of the magnetic hook shown in FIG. 1.

A first present preferred embodiment of my magnetic hook 1, shown in FIGS. 1 through 5, has a housing 2 having a generally rectangular base 4 with a front surface 3 and a back surface 5. A wall 6 extends from the perimeter of the back of the base 4, forming an open cavity 7. Four magnets 10, each within a U-shaped metal magnet holder 11, are placed within the cavity. Each magnet 10 has a hole 12 through its center. The magnets are held in place by a fastener 14. The fastener has a shaft portion 15 attached to the base 4 and a head 16 having a diameter larger than the hole 12. In a preferred embodiment the fastener 14, as well as the housing 2, are plastic. Immediately after being formed the fastener 14 is a straight shaft. The magnet is placed on the shaft and the end of the shaft is flattened to form the head 16. When the fastener is finished the shaft 15 may be slightly longer than the thickness of the magnet, allowing the magnet to pivot and move slightly up and down about the shaft as shown in FIG. 6. This pivoting ability allows the four magnets 10 in the embodiment shown in the drawings to conform to slightly curved and irregular surfaces on which the magnetic hook is mounted. Consequently, the magnetic attraction between the magnets and the mounting surface is greater than it would have been if the outer surfaces of the magnets were all in the same plane.

As can be most clearly seen in FIG. 5, I prefer that the wall 6 have a height greater than the thickness of the magnets 10 and their holders 11. I further prefer that the difference in height be about $1/16$ of an inch. Most metal filings or dirt that is attracted to the magnets and not readily apparent to the user will have a diameter not larger that $1/16$ of an inch. Should the magnet attract such metal filings or dirt 18 and the user places the magnetic hook on a mounting surface, the metal filings or dirt will not touch the mounting surface. Should the magnetic hook be slid across the mounting surface the metal filings or dirt will not scratch that surface. This difference in height does not solve the scratching problem if larger pieces of dirt are on the magnet. To further protect the mounting surface from being scratched I provide a finger tab 8 on one edge or wall of the housing 2. As can be seen most clearly in FIGS. 4 and 7, the finger tab has an arcuate segment or curved portion 9 that is sized and shaped to receive the tip of an adult finger. The apex of the curve is oriented toward a plane P shown in FIG. 4 that passes through the base 4. When a user desires to remove the magnetic hook from a mounting surface 30 he or she places a finger tip on the curved portion 9 of the finger tab 8. Since most adult finger tips have a greater diameter than the height of the housing 2 placement of the fingertip on the finger tab will cause the upper edge of the magnetic hook to move away from the mounting surface as shown in FIG. 7. This results in a pivoting action forcing the magnetic hook 1 away from the mounting surface with little or no sliding. Consequently, any dirt on the magnets will not scratch the mounting surface.

Figure 8:
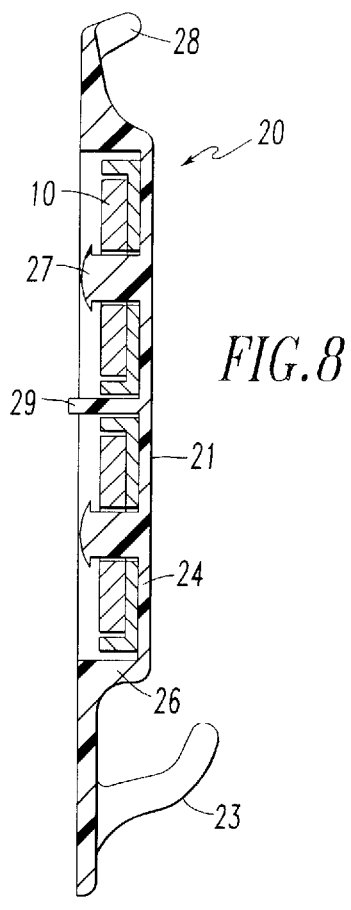
FIG. 8 is a cross-sectional view similar to FIG. 5 showing an alternative embodiment of the magnetic hook or clip.
Figure 9:
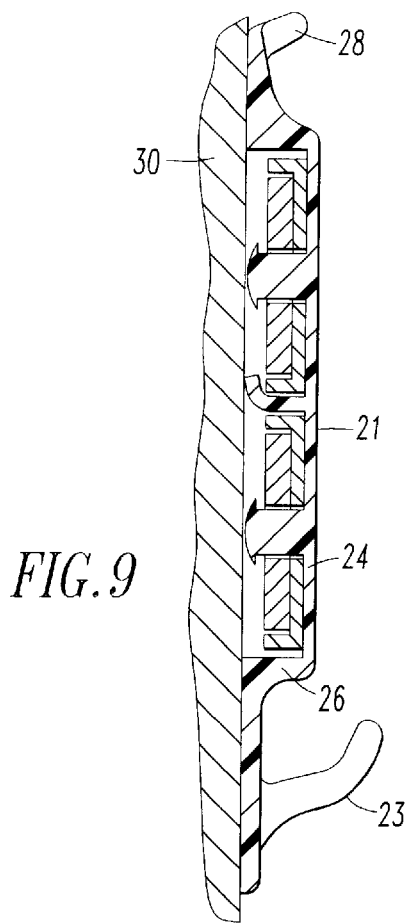
FIG. 9 is a cross-sectional view showing the magnetic hook shown in FIG. 8 mounted against a mounting surface.

Referring to FIGS. 8 and 9 an alternative present preferred embodiment 20 is quite similar to the first embodiment shown in FIGS. 1 through 5. There is a housing 21 with a base 24 and walls 26 extending from the base. A plurality of magnets 10 in magnet holders 11 are attached to the base by fasteners 27. A finger tab 28 extends from one end of the housing 21 and a hook 23 extends from the opposite end. In this embodiment there is a flexible fin 29 between pairs of magnets 10. The fin could extend around one or more magnets or be adjacent to one or more magnets. This fin has a height slightly larger than the height of the wall 26 of the housing. As can be seen in FIG. 9 when the hook 20 is placed against a mounting surface 30, such as a metal wall or plate, the magnetic forces of magnets 10 will pull the hook toward the mounting surface. As this occurs the flexible fin 29 will bend and may also be compressed to a smaller height above the magnet and bear against surface 30. This provides frictional contact between the flexible wall and the mounting surface. Such frictional contact increases the load bearing capability of the hook. While the difference in height may vary according to the particular plastic from which the flexible wall is molded, a difference of between $1/32$ and $1/16$ of an inch should be satisfactory.

I prefer to mount the magnets in the housing in a manner to maintain them in a spaced apart relationship. This can be done by providing a wall such as fin 29 between adjacent magnets or by mounting the magnets so that they cannot move toward one another. Such movement can be prevented by providing a square or other noncircular hole 12 through the magnet and providing a fastener shaft 15 or boss having a similarly shaped cross-section that fits through or into the hole 12. I tested two hooks similar to that shown in FIGS. 1 through 5. In one hook, the magnets were free to rotate around the fastener. The other hook had walls between adjacent magnets made of the same plastic material as the housing. Those walls were not as tall as the wall 6 of the housing. Progressively increasing weight was placed on each hook. The hook with the walls between magnets held seven pounds before sliding while the hook without the walls held only five pounds. I attribute the difference in performance to rotation of the magnets in the hook without walls between magnets.

Figure 10:
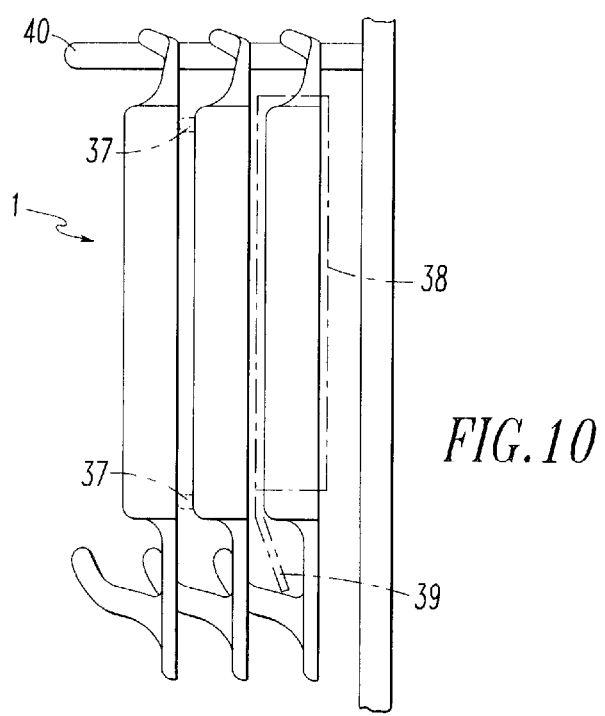
FIG. 10 is a side view of three magnetic hooks of the type shown in FIGS. 1 through 4 hung on a display rack and nested together.

The embodiments shown in FIGS. 1 through 9 have a curved hook 23. I prefer to provide a hole 13 in the housing wall above and behind the hook. Consequently, the magnetic hooks will nest when stacked or hung on a display hook 40 as shown in FIG. 10. A cardboard sleeve 38, shown in chainline in FIG. 10, may be provided around the magnetic hook. The sleeve carries the product name, UPC code and other information. The sleeve also separates adjacent hooks permitting easier separation and removal from a rack 40. We have found that the magnets lose strength if they are stacked closely together. The sleeve puts two layers of chipboard between every set of magnets, reducing the loss of strength. We may also mold protuberances 37 into the holder to separate them further. A preferred sleeve has a tab 39 that rests on the hook keeping the sleeve straight and preventing the sleeve from falling off.

Figure 11:
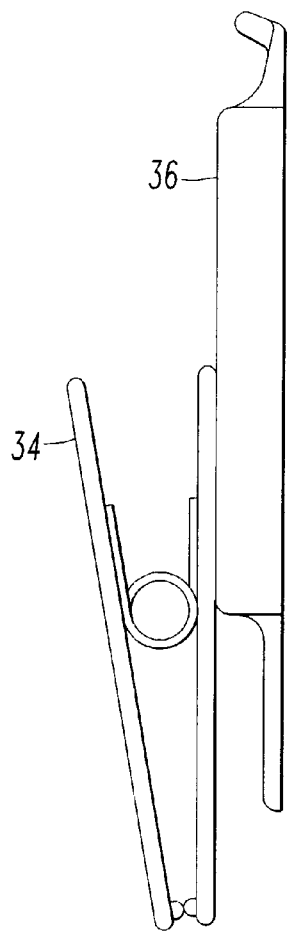
FIG. 11 is a side view of another present preferred embodiment having a jaw-type clip.

The present invention may be provided with a jaw-type clip rather than a curved hook. As shown in FIG. 11, a jaw-type clip 34 has been attached to the housing 36 containing the magnets. That housing and the magnets are similar to the housing and magnets of the first embodiment shown in FIGS. 1 through 5.

Figure 12:
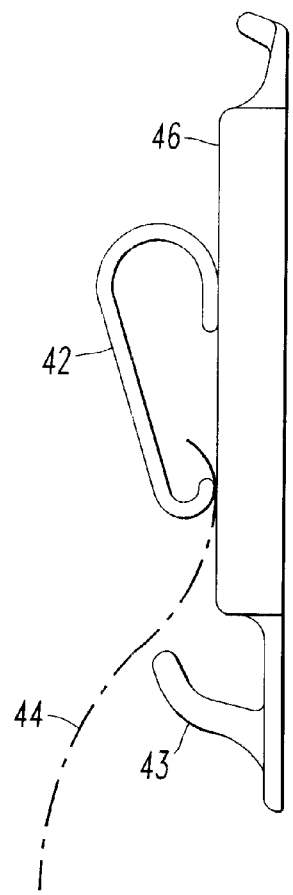
FIG. 12 is a side view of yet another present preferred embodiment having a spring clip.

In the embodiment of FIG. 12 a spring clip 42 has been attached to the housing 46 containing the magnet. A piece of paper or other object 44, shown in dotted line, can be held under the spring clip 42. This magnetic holder could be made with or without hook 43.

The housing for the magnetic hook disclosed here could be made a number of plastics. Polypropylene styrene, K-resin, and polyvinyl chloride are suitable plastics. If we use polypropylene, we need to provide cross ribs to keep the plastic base flat. Otherwise, it becomes concave and the inner sides of the magnets may be lifted off the surface. The housing could also be metal.

The magnetic hook disclosed here is particularly useful for hanging Christmas wreaths and other seasonal decorations. Such decorations can be easily hung on any metal surface. At the end of the season the decorations and hook can be easily removed from the mounting surface without scratching that surface.

Although I have shown certain present preferred embodiments of my magnetic hook and magnetic clip, it should be distinctly understood that the invention is not limited thereto but maybe variously embodied within the scope of the following claims.

I claim:

1. A magnetic hook comprising:
   a housing having a base and at least one wall extending from the base such that the base and the at least one wall define a cavity, the cavity having an opening opposite the base and the at least one wall having a selected height, an inner surface and an outer surface;
   at least one magnet positioned within the cavity and attached to the base of the housing, the at least one magnet having a thickness that is less than the selected height of the at least one wall;
   a hook extending from the housing; and
   a finger tab attached to the outer surface of the at least one wall, the finger tab having an arcuate segment sized to receive a finger tip, the arcuate segment being spaced apart from the at least one wall and having an apex oriented toward a plane in which the base lies.

2. The magnetic hook of claim 1 also comprising a magnet holder for each magnet, the magnet holder having a base and two parallel walls extending from the base, the magnet positioned on the base of the magnet holder and wherein the base of the magnet holder is positioned between the magnet and the base of the housing.

3. The magnetic hook of claim 1 also comprising a fastener for each of the at least one magnet, the fastener having a head and a shaft, the shaft extending from the base through a hole in the magnet.

4. The magnetic hook of claim 3 wherein the shaft has a height sufficiently greater than the thickness of the at least one magnet and a diameter sufficiently smaller than the hole through the magnet to enable the magnet to pivot and move up and down on the shaft.

5. The magnetic hook of claim 1 wherein the hook is comprised of a hook base extending from the at least one wall and a hook member extending outward from the hook base, a portion of the hook member being over a portion of the hook base.

6. The magnetic hook of claim 5 wherein a hole is provided through the portion of the hook base over which the hook member extends, the hole being sized and positioned to permit nesting of magnetic hooks stacked one upon another.

7. The magnetic hook of claim 1 also comprising at least one flexible fin attached adjacent the at least one magnet and extending above the magnet and the base, the at least one flexible fin being made of a flexible material such that when the magnet is placed against a mounting surface the flexible fin will flex to a smaller height and bear against the mounting surface.

8. The magnetic hook of claim 1 wherein the at least one magnet is at least two magnets and the magnets are mounted in a manner to prevent movement of adjacent magnets toward one another.

9. The magnetic hook of claim 8 wherein each magnet has a noncircular hole and further comprising a fastener having a portion within the hole that has a cross-section of the same shape as the noncircular hole.

10. The magnetic hook of claim 1 also comprising a spring clip attached to the housing.

11. A magnetic clip comprising:
   a housing having a base and at least one wall extending from the base such that the base and the at least one wall define a cavity, the cavity having an opening opposite the base and the at least one wall having a selected height, an inner surface and an outer surface;
   at least one magnet positioned within the cavity and attached to the base of the housing, the at least one magnet having a thickness that is less than the selected height of the at least one wall;
   a jaw-type clip extending from the housing; and
   a finger tab attached to the outer surface of the at least one wall, the finger tab having an arcuate segment sized to receive a finger tip, the arcuate segment being spaced apart from the at least one wall and having an apex oriented toward a plane in which the base lies.

12. The magnetic clip of claim 11 also comprising a fastener for each of the at least one magnet, the fastener having a head and a shaft, the shaft extending through a hole in the magnet and into the base.

13. The magnetic clip of claim 12 wherein the shaft has a height sufficiently greater than the thickness of the at least one magnet and a diameter sufficiently smaller than the hole through the magnet to enable the magnet to pivot and move up and down on the shaft.

14. The magnetic hook of claim 11 also comprising at least one flexible fin attached adjacent the at least one magnet and extending above the magnet and the base, the at least one flexible fin being made of a flexible material such that when the magnet is placed against a mounting surface the flexible fin will flex to a smaller height and bear against the mounting surface.

15. A magnetic clip comprising:
- a housing having a base and at least one wall extending from the base such that the base and the at least one wall define a cavity, the cavity having an opening opposite the base and the at least one wall having a selected height, an inner surface and an outer surface;
- at least one magnet positioned within the cavity and attached to the base of the housing, the at least one magnet having a thickness that is less than the selected height of the at least one wall;
- a spring clip extending from the housing; and
- a finger tab attached to the outer surface of the at least one wall, the finger tab having an arcuate segment sized to receive a finger tip, the arcuate segment being spaced apart from the at least one wall and having an apex oriented toward a plane in which the base lies.

16. The magnetic clip of claim 15 also comprising a fastener for each of the at least one magnet, the fastener having a head and a shaft, the shaft extending through a hole in the magnet and into the base.

17. The magnetic clip of claim 16 wherein the shaft has a height sufficiently greater than the thickness of the at least one magnet and a diameter sufficiently smaller than the hole through the magnet to enable the magnet to pivot and move up and down on the shaft.

18. The magnetic hook of claim 15 also comprising at least one flexible fin attached adjacent the at least one magnet and extending above the magnet and the base, the at least one flexible fin being made of a flexible material such that when the magnet is placed against a mounting surface the flexible fin will flex to a smaller height and bear against the mounting surface.

19. The magnetic clip of claim 15 also comprising a hook attached to the housing.

20. A magnetic hook or clip comprising:
- a housing having a base and at least one wall extending from the base such that the base and the at least one wall define a cavity, the cavity having an opening opposite the base;
- a hook or clip attached to the housing; and
- at least two magnets within the cavity and attached to the base, wherein each magnet has a noncircular hole and is attached to the base by a fastener passing through or into the hole, the fastener having a portion within the hole that has a cross-section of the same shape as the noncircular hole to maintain the magnets in a spaced apart relationship and prevent any magnet from moving toward another magnet.

* * * * *